United States Patent [19]

Kanai et al.

[11] Patent Number: 4,469,134

[45] Date of Patent: Sep. 4, 1984

[54] FOUR-WAY VALVE FOR REVERSIBLE REFRIGERATION CYCLE

[75] Inventors: Yoshikazu Kanai; Hideaki Ohira, both of Sayama, Japan

[73] Assignee: Kabushiki Kaisha Saginomiya Seisakusho, Tokyo, Japan

[21] Appl. No.: 363,578

[22] Filed: Mar. 30, 1982

[30] Foreign Application Priority Data

Sep. 30, 1981 [JP] Japan .................. 56-153840

[51] Int. Cl.$^3$ .................. F16K 11/07; F16K 31/40
[52] U.S. Cl. .................. 137/625.43; 137/596.17; 251/30
[58] Field of Search .................. 137/625.29, 625.43, 137/596.17, 625.64; 251/30

[56] References Cited

U.S. PATENT DOCUMENTS

| | | | |
|---|---|---|---|
| 2,991,631 | 7/1961 | Ray .................. | 137/625.43 X |
| 3,400,736 | 9/1968 | Bastle et al. .................. | 137/625.29 |
| 4,254,798 | 3/1981 | Ott .................. | 137/625.64 X |

FOREIGN PATENT DOCUMENTS 543767  5/1956  Italy .................. 137/596.17

Primary Examiner—Arnold Rosenthal

[57] ABSTRACT

A four-way valve for reversible refrigeration cycle. It comprises a casing, a delivery tube in communication with a compressor and opening into the casing, a suction tube in communication with the compressor and opening into the casing, a pair of tubes in communication with two heat exchangers respectively, and opening into the casing one on each side of the suction tube, valve means for communicating the suction tube selectively with either one of the pair of tubes; and a two-way pilot valve mounted longitudinally to the casing. The two-way valve longitudinally mounted to the valve body of the reversible valve permits its vertical installment, thus remarkably reducing horizontal space required therefor.

3 Claims, 3 Drawing Figures 4,469,134

FOUR-WAY VALVE FOR REVERSIBLE REFRIGERATION CYCLE

BACKGROUND OF THE INVENTION

The present invention relates to an improvement in a four-way valve for a reversible refrigeration cycle.

The applicant has proposed a four-way valve for a reversible refrigeration cycle of the type which has a plunger or piston and annular valve tongues or walls moulded integrally to constitute a valve spool. The present invention constitutes an improvement to such a prior art concerning the switching mechanism for operating the valve spool.

A four-way valve of the type described comprises a casing constituted by two cylinders of different diameters connected together. Open into the casing are a delivery tube which leads to the delivery side of a compressor, a suction tube leading to the suction side of the compressor, and tubes leading to first and second heat exchangers, respectively. A valve member is slidably disposed in the casing to selectively communicate the suction tube with the two tubes leading to the heat exchangers. The valve member is actuated by mechanism which includes a solenoid operated two-way valve. The valve member comprises a unitary valve spool having a hollow cylindrical section around which first to third pressure receiving portions are formed; the first and second pressure receiving portions sliding in a larger diameter cylinder of the casing and the third pressure receiving portion sliding in a smaller diameter cylinder of the same casing, both within a range of selective communication between the suction tube and the two tubes connected with the heat exchangers. An opening is formed through the peripheral wall of the hollow cylindrical section between the first and second pressure receiving portions. The suction tube is selectively communicatable with the tubes concerned depending on the positional relationship between the three pressure receiving portions and the casing, which varies with the movement of the valve spool.

SUMMARY OF THE INVENTION

It is an object of the present invention to move a valve spool of a four-way valve of the type described from a first position to a second position or vice versa by energizing or deenergizing a coil of a solenoid operated two-way valve. The two-way valve for operating the valve spool projects outwardly from a plug fitted in a larger diameter casing section and coaxially with the casing.

In accordance with the present invention, a plug fitted in a larger diameter section of a casing is formed with an axially outward extension in which a plunger tube of a two-way solenoid operated valve is coupled. A plunger of the two-way valve carries a ball at its leading end so that a first chamber is defined between the plug and the ball. The plug has a second chamber defined at its back. The plug is formed with a through passageway which provides communication between the first and second chambers and blocked by the ball upon deenergization of the solenoid coil but unblocked upon energization of the same, a passageway for introducing compressed fluid from a compressor into the first chamber, and a passageway communicating the second chamber to the suction side of the compressor. A rod extends throughout the through passageway of the plug and has a length somewhat longer than the length of said passageway. The rod is engagable with the ball at its one end and constantly engaged by an intermediate portion of a leaf spring at its other end. The leaf spring is disposed in the second chamber and securely connected to the plug at its one end while carrying at its other end a flat valve disc for blocking and unblocking the passageway adapted to communicate the second chamber to the compressor suction side. When the solenoid coil is deenergized, the valve disc is urged by the rod via the ball to unblock the corresponding passageway; when the solenoid coil is energized, the valve disc brings the associated valve disc into a blocking position.

With this construction, when the solenoid coil is deenergized, the ball on the plunger closes the corresponding passageway while, at the same time, urging the rod in the passageway. The rod in turn moves the leaf spring until the valve disc on the leaf spring unblocks the corresponding passageway. As the compressor is driven, compressed fluid from the compressor is communicated to the first chamber while the second chamber still remains low in pressure due to communication with the suction side of the compressor. Accordingly, the high pressure fluid is supplied to first and second larger diameter pressure receiving portions of a valve spool and the low pressure to the opposite sides of a third pressure receiving portion. While the pressures acting on the first and second pressure receiving portions are balanced with each other, they are higher than the pressure acting on the third pressure receiving portion so that the valve spool is displaced to a first position where the first pressure receiving portion abuts against a plug in a larger diameter casing section. Upon energization of the solenoid coil, the plunger of the two-way valve is attracted by the core accompanied by the ball so as to open the cooperating passageway. Simultaneously, the rod is released from the ball and the leaf spring is returned to close the cooperating passageway by the valve disc carried thereon. When the compressor is started under this condition, the high pressure fluid in the first chamber is advanced into the second chamber via the through passageway in the plug.

As a result, the first larger pressure receiving portion is subjected to the same high level of pressure at its opposite ends. Each of the second larger pressure receiving portion and third smaller pressure receiving portion is subjected to high and low pressures at its opposite ends, that is, the pressure differential between these two portions is zero. However, due to the difference in cross sectional area between said two portions, the valve spool is displaced to a second position where the smaller pressure receiving portion abuts against the plug in a smaller diameter casing section.

BRIEF DESCRIPTION OF THE DRAWINGS

A preferred embodiment of the present invention will be described with reference to the accompanying drawings in which.

DETAILED DESCRIPTION OF THE EMBODIMENTS

Figure 1:
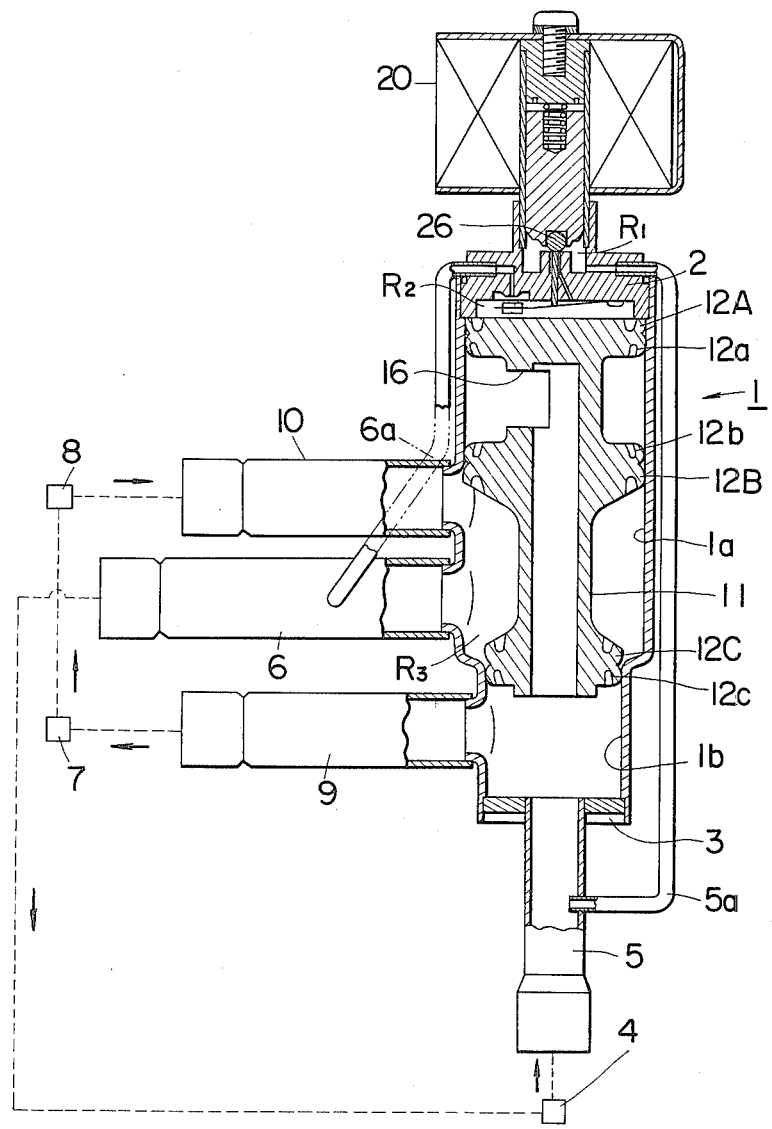
FIG. 1 is a section of a four-way valve embodying the present invention.

Referring to FIG. 1 of the drawings, a four-way valve embodying the present invention has a generally cylindrical casing of metal which is generally designated by the reference numeral 1. The casing comprises a first section 1a and a second section 1b which is smaller in diameter than the first section 1a. Plugs 2, 3 are securely fitted by welding in the opposite open ends of the casing 1 in the form of a large diameter plug and a small diameter plug, respectively. A delivery tube 5 is connected with the plug 3 to extend therefrom to the delivery side of a compressor 4. A suction tube 6 is connected with the peripheral wall of the casing 1 and leads therefrom to the suction side of the compressor 4. A tube 9 leads from the casing 1 to a heat exchanger 7 which selectively serves as a condenser and an evaporator. Likewise, but on the opposite side of the suction tube 6, a tube 10 leads from the casing 1 to a second heat exchanger 8 which functions in the same way as the first heat exchanger 7. A valve spool 11 formed of resin is slidably received in the casing 1. The valve spool 11 includes a pressure receiving portion 12C located at one end of the valve spool and formed with an annular tongue or wall 12c therearound which is slidably engaged with the inner wall of the smaller diameter casing section 1b. The valve spool 11 also includes a second pressure receiving portion 12B located at an axially intermediate position of the valve spool and formed with an annular tongue or wall 12b therearound which is slidably engaged with the inner wall of the larger diameter casing section 1a. Further included in the valve spool 11 is a third pressure receiving portion 12A located at the other end of the valve spool 11 and formed with an annular tongue or wall 12a which is slidably engaged with the larger diameter casing section 1a as the second pressure receiving portion 12B.

Figure 2:
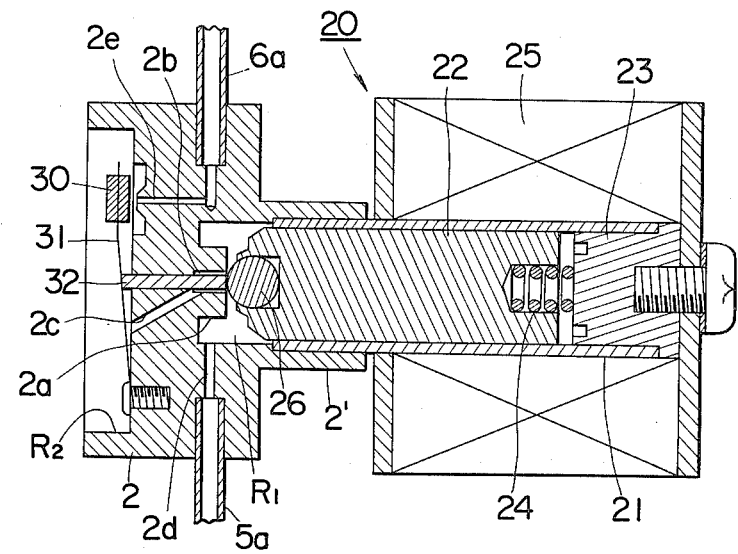
FIGS. 2 and 3 are sections of a mechanism for operating a valve spool of the four-way valve.

The tongues or walls 12a, 12b, 12c on the valve spool 11 are located so that they will communicate the tubes 6, 10 to each other in a first position of the valve spool shown in FIG. 1, but communicate the tubes 6, 9 to each other in a second position in which the valve spool 11 has moved from the position of FIG. 1. The valve spool 11 is operated by a mechanism which will be described hereinafter with reference also to FIGS. 2 and 3.

The plug 2 fitted in the larger diameter casing section 1a is provided with an axially outward extension 2' which is coupled over and secured to a plunger tube 21 of a solenoid operated pilot valve 20. The pilot valve 20 has a known two-way construction which comprises a stationary iron core 23, a plunger 22 slidably received in the plunger tube 21, a coil 25 wound around the iron core 23 and a return spring 24 loaded between the iron core 23 and the plunger 22. A valve member in the form of a ball 26 is securely carried on the leading end of the plunger 22.

The plug 2 is formed with a valve seat 2a which projects toward the plunger 22 in axial alignment with the ball 26. The facing ends of the plug 2 and plunger 22 define a chamber $R_1$ therebetween while the plug 2 is partly notched on its back to define a chamber $R_2$.

A first passageway 2b extends throughout the plug 2 to provide fluid communication between the chambers $R_1$, $R_2$. Said first passageway has a larger diameter section on a plunger side of the plug and a smaller diameter section on a four-way valve side of the plug. A second passageway 2c branches off the larger diameter section of the first passageway 2b at the valve seat 2a and leads to the back of the plug 2. A bleed tube 5a branches off the delivery tube 5 to communicate to the chamber $R_1$ by way of a third passageway 2d. Further, a fourth passageway 2e extends from the back of the plug 2 into communication with a bleed tube 6a. A leaf spring 31 is disposed in the chamber $R_2$ and secured at its one end to the back of the plug 2. A flat valve disc 30 is carried on the other or free end of the spring 31 to be constantly urged in a direction for closing the passageway 2e. A rod 32 is slidably received in the axial passageway 2b. When the ball 26 at the leading end of the plunger 22 is seated on the valve seat 2a to block the passageway 2b, it presses the rod 32 axially which in turn presses an intermediate portion of the spring 31 to move the valve disc 30 clear of the plug 2 to thereby unblock the passageway 2e.

The four-way valve having the above construction will be operated as follows.

While the solenoid 25 is deenergized, the plunger 22 is urged by the return spring 24 to the left as shown in FIG. 1. Under this condition, the ball 26 on the plunger 22 closes the first passageway 2b in the valve seat 2a and moves the rod 32 to the left in the drawing. The rod 32 therefore urges the spring 31 away from the plug 2 whereby the valve disc 30 is positioned to open the passageway 2e (see FIG. 2). As the compressor 4 is driven in this situation, compressed fluid in the delivery tube 5 is admitted in the space defined between the pressure receiving portion 12C and the plug 3 and, also, in the annular space between the pressure receiving portions 12A and 12B. The high pressure fluid is further communicated into the chamber $R_1$ by the bleed tube 5a while the ball 26 keeps the first passageway 2b still closed. Meanwhile, since the valve disc 30 maintains the fourth passageway 2e open, a low pressure fluid is communicated from the suction tube 6 into the chamber $R_2$ between the plug 2 and the pressure receiving portion 12A and a space $R_3$ between the pressure receiving portions 12B, 12C by way of the bleed tube 6a, which is connected with the suction tube 6. As a result, though the pressure differential between the opposite surfaces of each larger pressure receiving portion 12A and 12B becomes zero, the valve spool 11 is shifted upwardly as shown in FIG. 1 by the pressure differential between the opposite ends of the smaller pressure receiving portion 12C until the pressure receiving portion 12A abuts against the plug 2. This is the first position of the valve spool 11. The fluid is therefore allowed to circulate through the compressor 4, tube 9, heat exchanger 7, heat exchanger 8, tube 10 and suction tube 6 in this order by the annular space defined by the pressure receiving portions 12B and 12C.

Figure 3:
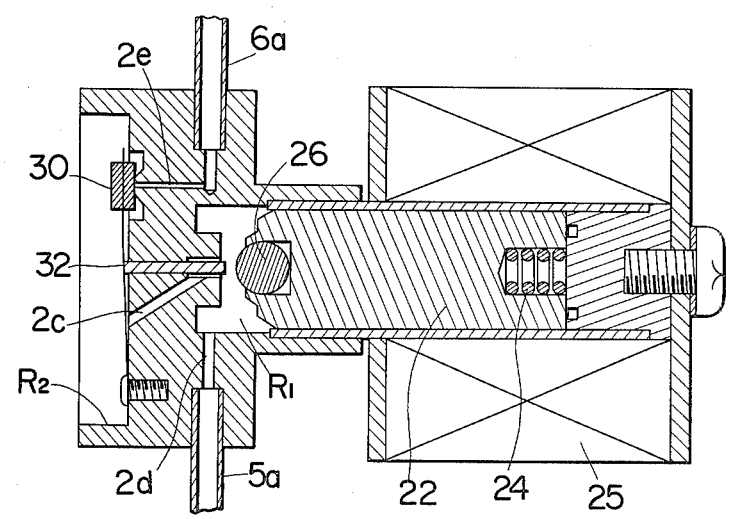

As the solenoid coil 25 is energized, the plunger 22 is attracted by the core 23 as indicated in FIG. 3. Then, the ball 26 on the plunger 22 moves off the valve seat 2a so that the rod 32 is urged upwardly by the spring 31 as viewed in FIG. 3 and the valve disc 30 blocks the fourth passageway 2e. The high pressure fluid in the chamber $R_1$ is then admitted in the chamber $R_2$ via the second passageway 2c. Under this condition, the pressures acting on the opposite surfaces of the pressure receiving portion 12A are equal to each other and so are the pressures acting on the pressure receiving portions 12B, 12C. Nevertheless, the valve spool 11 is moved downwardly due to the difference in effective cross sectional area between the pressure receiving portions 12B and 12C, until the pressure receiving portion 12C abuts against the plug 3. The fluid now circulates through the compressor 4, tube 10, heat exchanger 8, heat exchanger 7, tube 9 and suction tube 6 in this order via the annular space between the adjacent pressure receiving portions 12B and 12C.

In summary, it will be seen that the two-way electromagnetic pilot valve of the present invention acts to operate the reversible valve of the refrigeration system with simplified arrangement of bleed tubes. Further, the two-way electromagnetic valve longitudinally mounted to the valve body of the reversible valve to extend longitudinally permits vertical installation of the reversible valve, remarkably reducing horizontal space required therefor. Still further, the integral structure of the spool valve having three annular pressure receiving portions provides protection against fluid leakage with its annular tongues in the event of any possible spool rotation during valve operation.

What is claimed is:

1. A four-way valve for reversible refrigeration cycle which comprises a casing having a small diameter section and a large diameter section;

a delivery tube in communication with a compressor and opening into said casing;

a suction tube in communicating with said compressor and opening into said casing;

a pair of tubes in communication with two heat exchangers, respectively, and opening into said casing one on each side of the suction tube;

a valve means for communicating said suction tube selectively with either one of said pair of tubes;

a two-way pilot valve including electromagnetic means and a plunger tube longitudinally mounted and extending with respect to the large diameter section of the casing, a plunger slidably fitted within said plunger tube, a plug provided to block the large diameter section to define a chamber in cooperation with said plunger tube;

said plug being formed with a first passageway to provide communication between the chamber and the large diameter section of the casing, said plunger normally being biased to close the first passageway while adapted to retract to open the first passageway by energization of the electromagnetic means, said first passageway having a larger diameter section on a plunger side of the plug and a smaller diameter section on a casing side of the plug, and a rod snugly and slidably received in said smaller diameter section of said first passageway to project from either one side of the plug;

said plug being further formed with a second passageway branching off the large diameter section of the first passsageway to provide communication between the large diameter section of the casing and the chamber of the two-way pilot valve;

said plug being still further formed with a third passageway to admit high pressure refrigerant from the compressor by way of said chamber and the second passageway into the large diameter section of the casing;

said plug being still further formed with a fourth passageway to admit low pressure refrigerant from the compressor directly into the large diameter section of the casing; and said plug having a leaf spring attached thereto on a casing side thereof at its one end and carrying a flat valve disc at its other end, said leaf spring biasing said flat valve disc to close the fourth passageway upon energization of the electromagnetic means and being adapted to open the same upon de-energization of the electromagnet means.

2. A four-way valve according to claim 1, wherein said valve means includes a hollow cylindrical body longitudinally extending within the casing and having a small diameter pressure receiving portion in snug sliding engagement with the casing small diameter section and a large diameter pressure receiving portion in snug sliding engagement with the casing large diameter section, and a pair of inclined walls projecting from around the hollow cylindrical body to define an annular chamber around said hollow cylindrical body in cooperation with the valve body such that said annular chamber communicates the suction tube selectively with either one of said pair of tubes.

3. A four-way valve according to claim 1, wherein said plunger carries a ball thereon within the chamber and closes and opens said first passageway by means of the ball.

* * * * *